United States Patent [19]

Park

[11] Patent Number: 5,687,408
[45] Date of Patent: Nov. 11, 1997

[54] CAMERA AND METHOD FOR DISPLAYING PICTURE COMPOSITION POINT GUIDES

[75] Inventor: Eun-gwan Park, Suwon, Rep. of Korea

[73] Assignee: Samsung Aerospace Industries, Ltd., Kyongsangnam-do, Rep. of Korea

[21] Appl. No.: 675,477

[22] Filed: Jul. 3, 1996

[30] Foreign Application Priority Data

Jul. 5, 1995 [KR] Rep. of Korea ............... 95-19631

[51] Int. Cl.⁶ .................... G03B 1/00; G03B 17/20
[52] U.S. Cl. .................... 396/271; 396/287; 396/296; 396/404; 396/405
[58] Field of Search .................... 396/287, 296, 396/121, 122, 123, 147, 404, 405, 271

[56] References Cited

U.S. PATENT DOCUMENTS 5,264,889  11/1993  Ishida et al. ............... 396/121 X
5,266,985  11/1993  Takagi ............... 396/287 X
5,473,403  12/1995  Suda et al. ............... 396/147 X

*Primary Examiner*—W. B. Perkey
*Attorney, Agent, or Firm*—Finnegan, Henderson, Farabow, Garrett & Dunner, L.L.P.

[57] ABSTRACT

A camera and method are disclosed which provide a photographer with a picture composition guide that may be viewed through the viewfinder. Standard composition points corresponding to golden section points are displayed for the photographer to see. LCD's or LED's are used to display the composition points, and an external display portion allows the photographer to check a display state of the standard composition points.

18 Claims, 8 Drawing Sheets

CAMERA AND METHOD FOR DISPLAYING PICTURE COMPOSITION POINT GUIDES

BACKGROUND OF THE INVENTION

1. Field of the Invention

The present invention relates to a camera having a picture composition adjustment function and a method of displaying standard composition points to serve as a photo composition guide to a user. More particularly, the standard composition points may be viewed through the camera's viewfinder to help a user properly arrange the photograph subject within the picture frame.

2. Description of the Related Art

FIG. 1 illustrates the structure of a conventional camera, which includes an object lens 1, a main mirror 2, and a viewfinder 10. The object lens 1 converges the image of a subject (not shown) inside the camera. The main mirror 2 reflects the image of the subject to the viewfinder 10. When a shutter (not shown) is released, main mirror 2 assumes a horizontal state so that the image of the subject is focused on a photosensitive portion 3.

The viewfinder 10 comprises a transmission liquid crystal display (LCD) 4, a penta-prism 5, and an eye lens 6. The penta-prism 5 is a pentagonal prism which twice reflects the image of the subject to the eye lens 6, enabling a user to see an erect or upright real image of the subject. The image of the subject seen by the user through the eye lens 6 corresponds to the image focused on the photosensitive portion 3.

FIG. 2 is a plan view of the transmission LCD 4 installed between the main mirror 2 and the penta-prism 5 shown in FIG. 1. Referring to FIG. 2, a visual field frame 4a indicating a photographicable area and a guide line 4b indicating a panorama photographing section are displayed on the transmission LCD 4.

In the conventional camera, it is possible to control the photographing area and image size using the visual field frame 4a and guide line 4b. However, it is hard to precisely orient the subject of a photograph according to standard composition conventions, because the conventional camera does not have any such guide within visual field frame 4a.

SUMMARY OF THE INVENTION

It is an object of the present invention to provide a camera that permits adjustment of picture composition by overlaying standard composition points within the visual field frame. Preferably the standard composition points correspond to golden section points of the field frame. Such composition points easily guide a user to proper photograph composition.

To achieve this object, there is provided a camera having an object lens, a main mirror, a penta-prism, an eye lens, a photosensitive portion, and a display device. The display device includes a rectangular display surface located in the main light path, the display surface having a central composition point $C_0$ located of a central junction of diagonals of the display surface, and four surrounding composition points $C_1$, $C_2$, $C_3$, and $C_4$ located at junctions between said diagonals and four lines, each line passing through one corner point of the rectangular display surface, and each line being perpendicular to one of the diagonals.

It is another object of the present invention to provide a method for displaying standard composition points for a user to view through the camera's viewfinder.

To achieve this object, there is provided a method of displaying standard composition points in a camera having a picture composition adjustment function. The method includes the steps of selecting between an initial and a user selected display state, and displaying standard composition points corresponding to the selected state. After a photograph is taken, the display is reset to the initial state.

The above objects and advantages of the present invention will become more apparent by the following detailed description of the preferred embodiments, with reference to the attached drawings.

BRIEF DESCRIPTION OF THE DRAWINGS

The accompanying drawings, which are incorporated in and constitute a part of the specification, illustrate preferred embodiments of the invention, and together with the general description of the invention given above, and the detailed description of the preferred embodiments given below, serve to explain the principles of the invention.

DETAILED DESCRIPTION OF THE PREFERRED EMBODIMENTS

Figure 1:
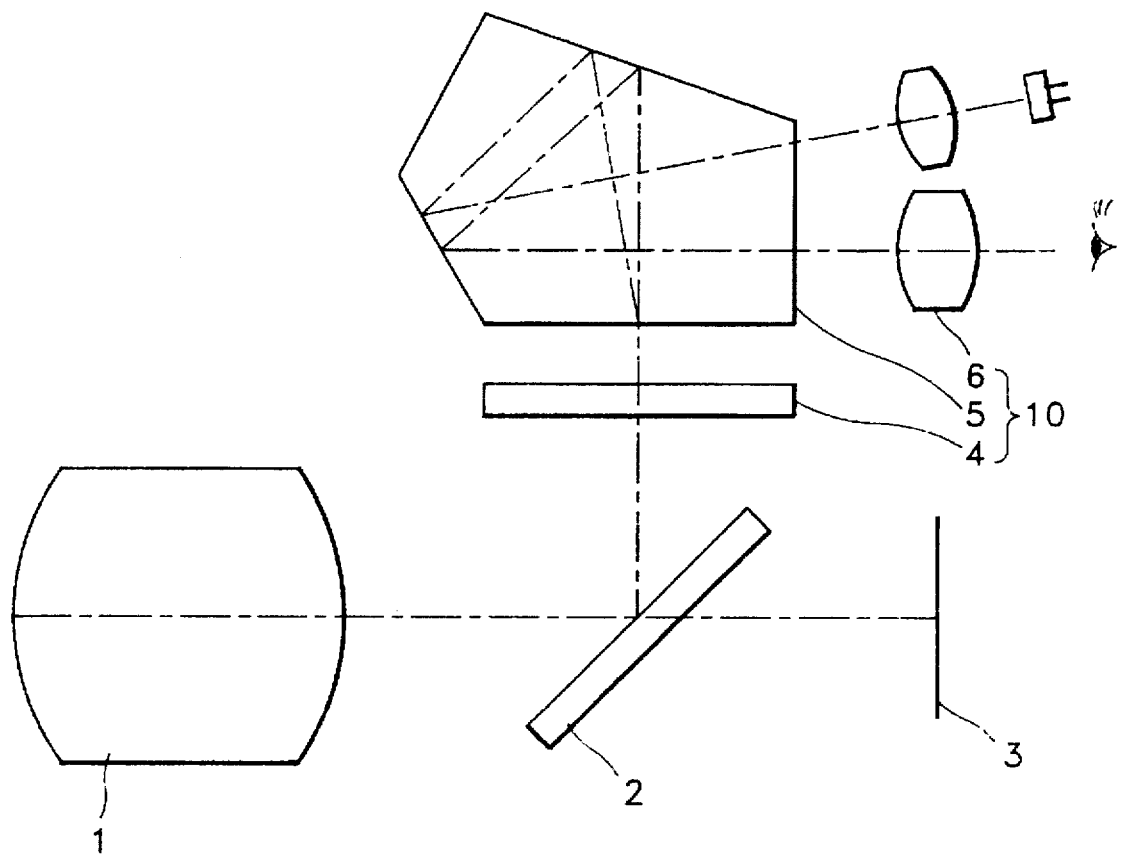
FIG. 1 is a schematic diagram generally illustrating the optical construction of a conventional camera.
Figure 2:
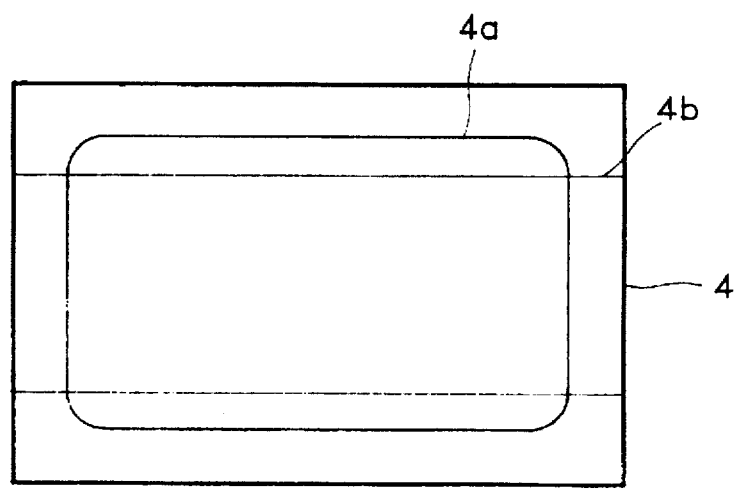
FIG. 2 is a front view of a liquid crystal display in the conventional camera of FIG. 1.
Figure 3:
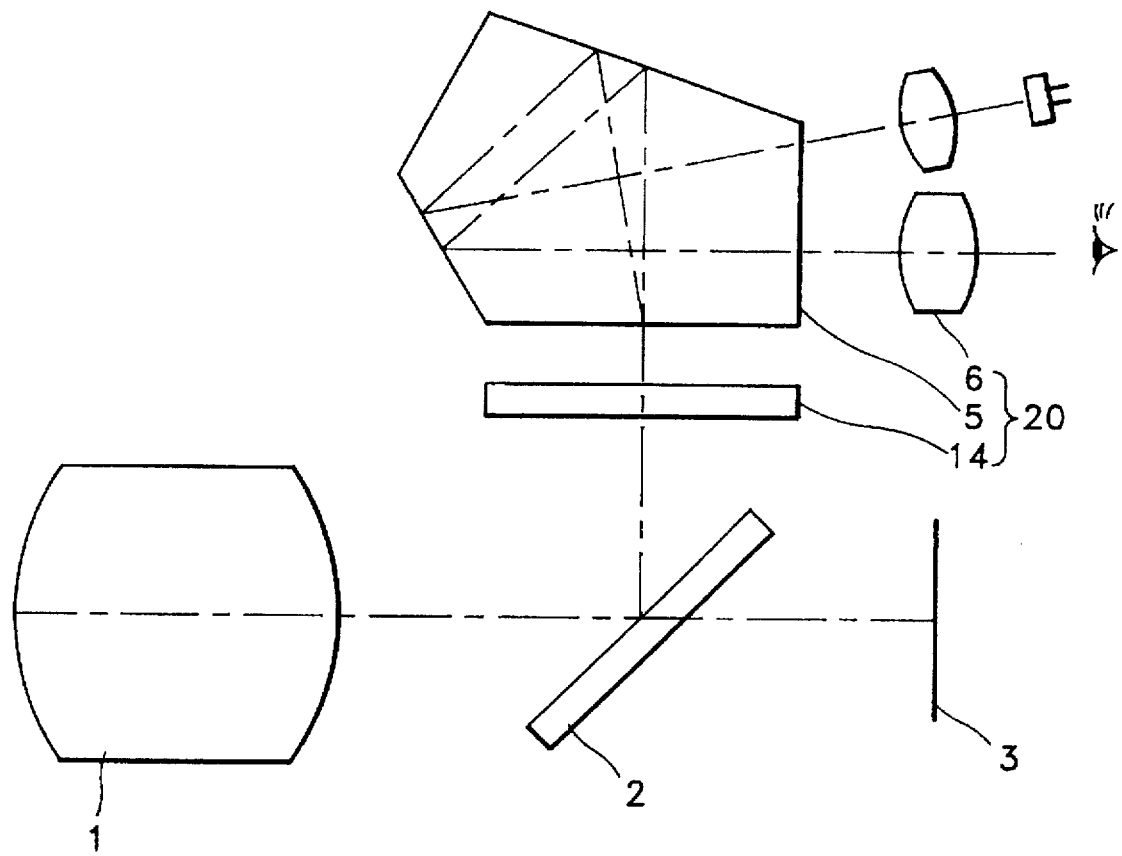
FIG. 3 is a schematic diagram illustrating the optical construction of a camera in accordance with a first embodiment of the present invention.
Figure 5:
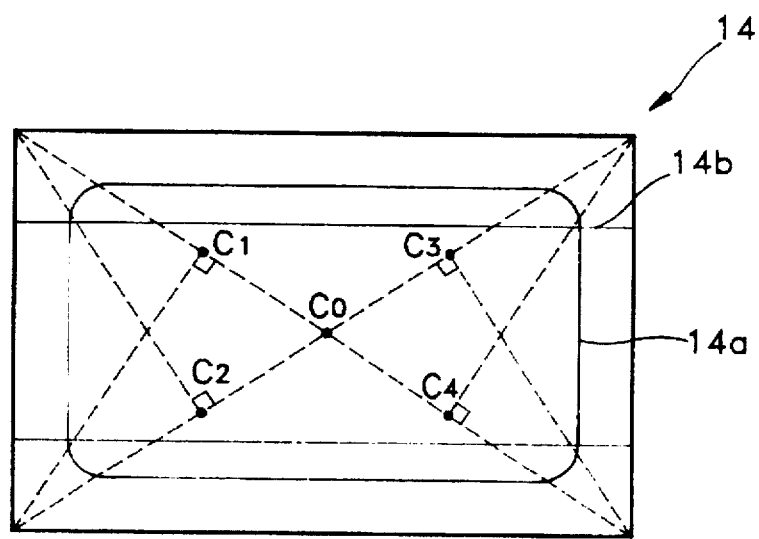
FIG. 5 is a front view of a display portion of the display device of FIG. 4.
Figure 4:
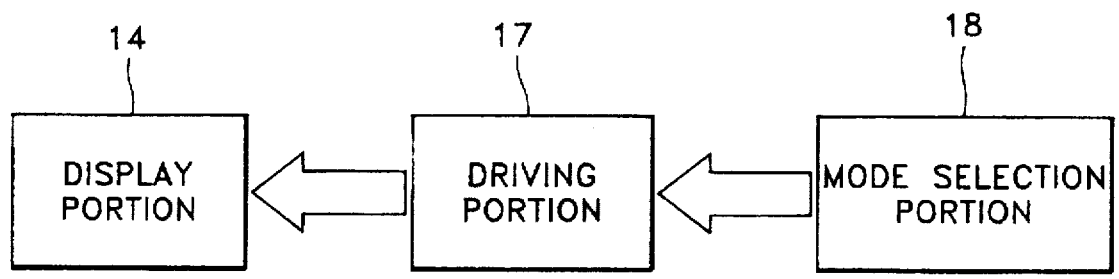
FIG. 4 is a block diagram illustrating the display device of the camera shown in FIG. 3.

A first embodiment of a camera with an adjustable picture composition function is illustrated in FIG. 3 to FIG. 5. To the extent the first embodiment contains elements similar to those of the conventional camera previously discussed and illustrated in FIG. 1, the same reference numerals are used.

In accordance with the invention, there is provided a display device having a rectangular display surface and a series of composition points thereon. As embodied herein, the display device includes a display portion 14 on which standard composition points $C_0$, $C_1$, $C_2$, $C_3$, and $C_4$ are displayed. The display portion 14 is located between a main mirror 2 and a penta-prism 5. A driving portion 17 selectively applies power to the display portion 14, and a mode selection portion 18 transmits signals controlling the display of the standard composition points $C_0$–$N_4$ to the driving portion 17 according to a user's selection.

The mode selection portion 18 is provided to enable a user to control the display of standard composition points $C_0$–$C_4$.

Mode selection portion 18 preferably has a structure which is easy to manipulate, and may be located on the exterior of the camera.

The display portion 14 is formed of a rectangular transmission LCD and selectively displays the standard composition points $C_0$–$C_4$. Preferably, the standard composition points $C_0$–$C_4$ correspond to golden section points of the rectangular display portion 14. Namely, the golden section points include a central point located at a junction $C_0$ of two diagonal lines of the rectangular display portion 14, and four surrounding points located at junctions $C_1$, $C_2$, $C_3$, and $C_4$ of each diagonal line and perpendicular lines extending from four apexes or corners of the rectangular display portion 14. The standard composition points $C_0$–$C_4$ can be selectively displayed on the display portion 14. This permits a user to take a photograph of a subject following principles of good composition by aligning the subject within composition points $C_0$–$C_4$.

A visual field frame 14a indicating a photographicable area and a guide line 14b indicating a panorama photographing section are preferably printed on the display portion 14.

Figure 6:
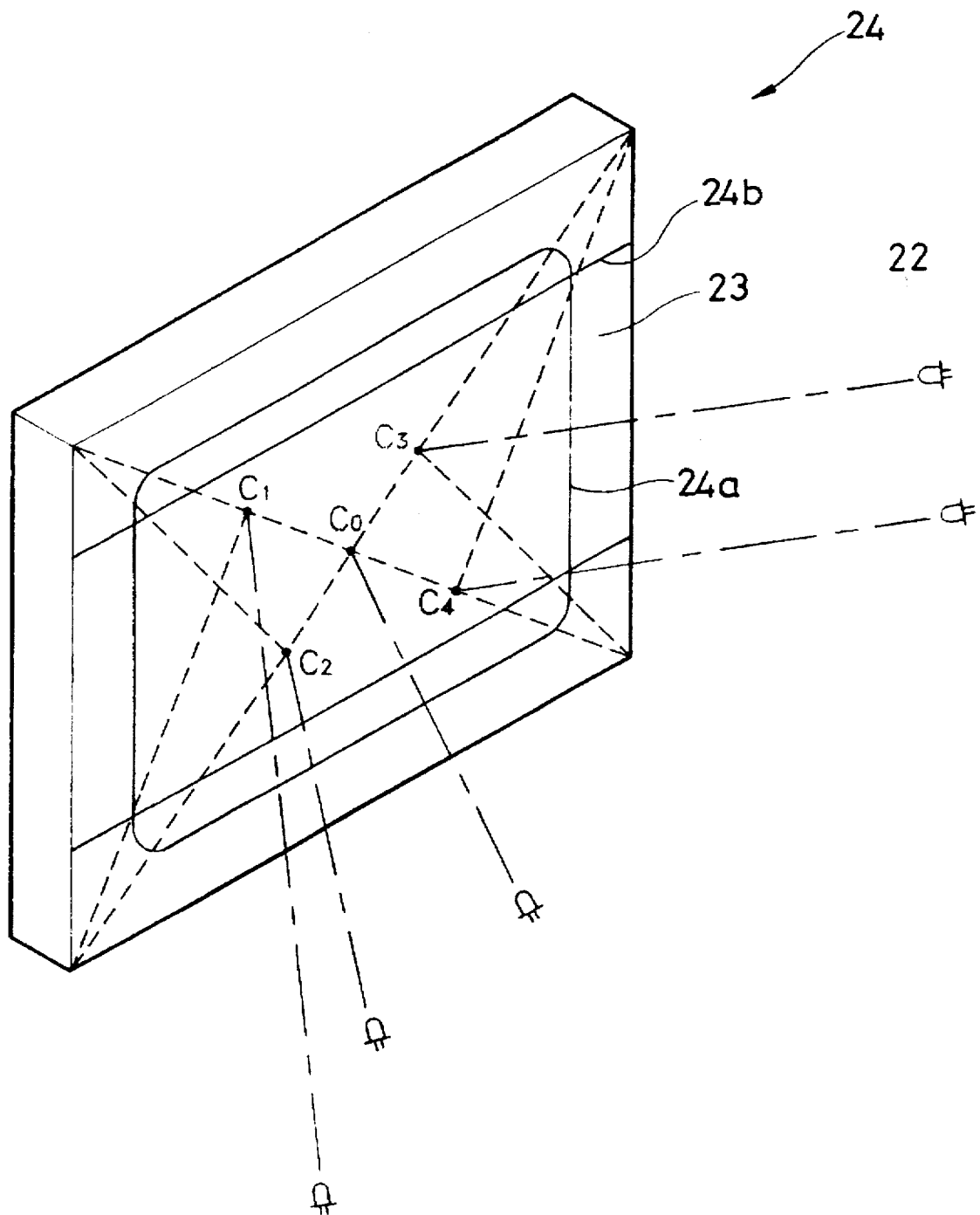
FIG. 6 is a schematic perspective view illustrating another embodiment of the display device of FIG. 4.

The display portion may alternatively be constructed as illustrated in FIG. 6. In this alternative embodiment, display portion 24 includes plural light sources 22 which are selectively turned on and off. These light sources are preferably light emitting diodes (LED's). The display portion 24 also includes display surface 23 on which are located five standard composition points $C_0$, $C_1$, $C_2$, $C_3$, and $C_4$ corresponding to the golden section points of the rectangular display. These standard composition points $C_0$–$C_4$ are selectively displayed by the light irradiated from the light sources 22 to each point on the display surface 23. A visual field frame 24a and a guide line 24b are further preferably printed on the display surface 23.

In the camera according to the present embodiment, a display state of the respective standard composition points $C_0$–$C_4$ remain as selected, unless the film loaded into the camera is exhausted or an alternative display state is selected by a user. Also, the display of the standard composition points $C_0$–$C_4$ can be reset whenever each photograph is taken. The user can preferably select at will between the display states described above.

Figure 7:
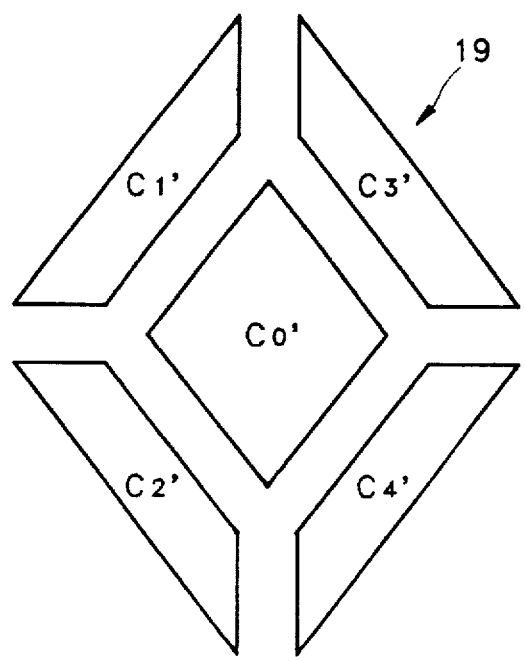
FIG. 7 is a schematic view illustrating an external display for the camera depicted in FIG. 3.

The display device of the invention may also include an external display 19 as illustrated in FIG. 7. The external display 19 permits a user viewing the exterior of the camera to check the display state of the standard composition points $C_0$–$C_4$ on the display portion (14 in FIG. 5 and 24 in FIG. 6). The external display 19 is formed of an LCD or LED and comprises five portions $C_0'$, $C_1'$, $C_2'$, $C_3'$, and $C_4'$ which correspond to the standard composition points $C_0$, $C_1$, $C_2$, $C_3$, and $C_4$, respectively.

The user can determine the display state of the standard composition points $C_0$–$C_4$ displayed inside the camera by observing the external display 19 since, for example, once the standard composition points $C_0$ and $C_4$ are displayed on the display portion 14 (FIG. 5) inside the camera, the corresponding portions $C_0'$ and $C_1'$ of the external display 19 are simultaneously displayed.

Figure 8:
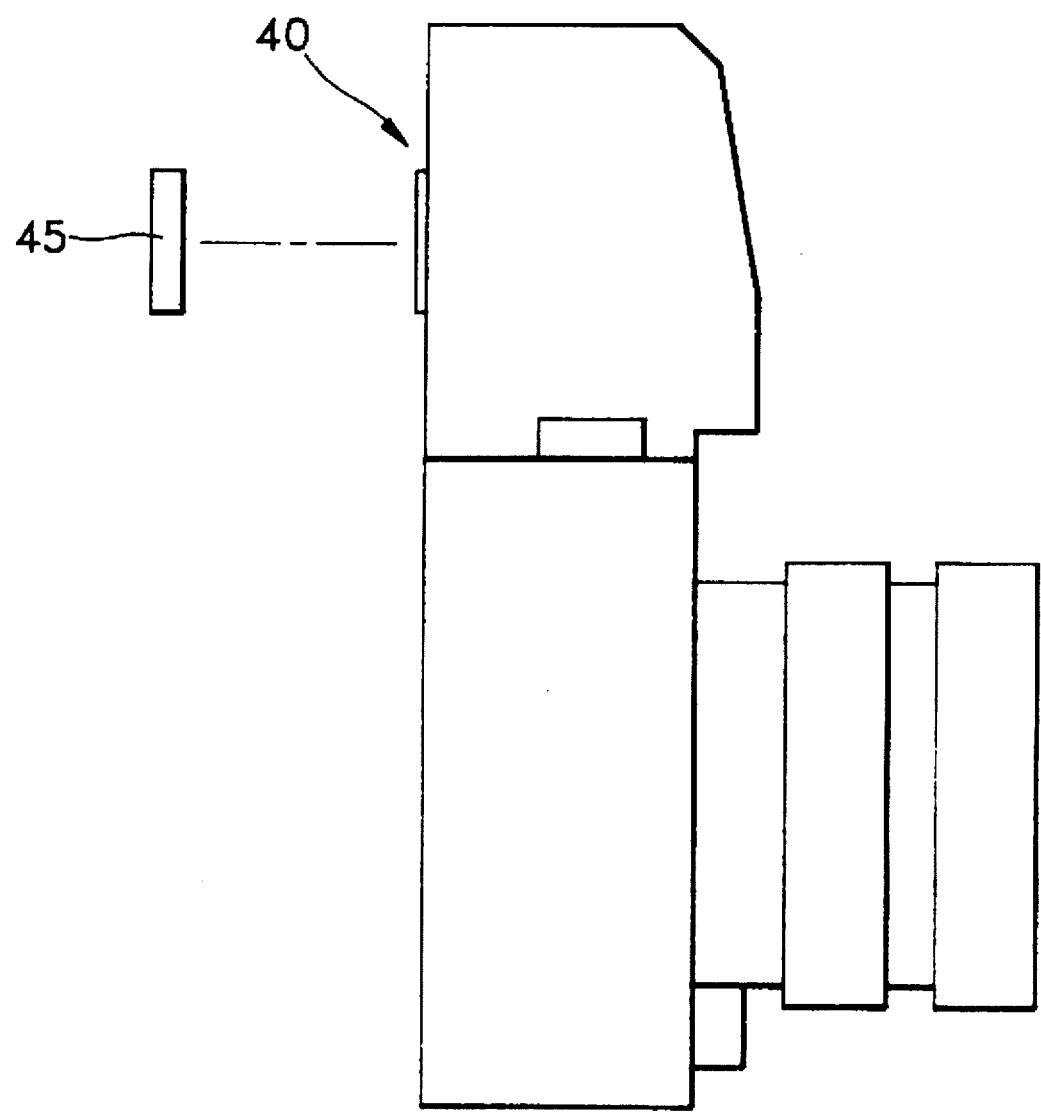
FIG. 8 is a side view of a camera in accordance with another embodiment of the present invention.

FIG. 8 discloses an alternate embodiment of the invention, including a display device 45 releasably integrated with the exterior portion of the camera's viewfinder 40. The display device 45 is formed of transparent materials such as glass and plastic, and the standard composition points (not shown) corresponding to the golden section points are displayed thereon, as shown in FIGS. 5 and 6. The standard composition points, like the visual field frame (not shown) and the guide line (not shown), can be printed on the surfaces of the transparent materials. The user is provided with this guide to good composition after connecting the display device 45 to the viewfinder 40 of the camera.

Figure 9:
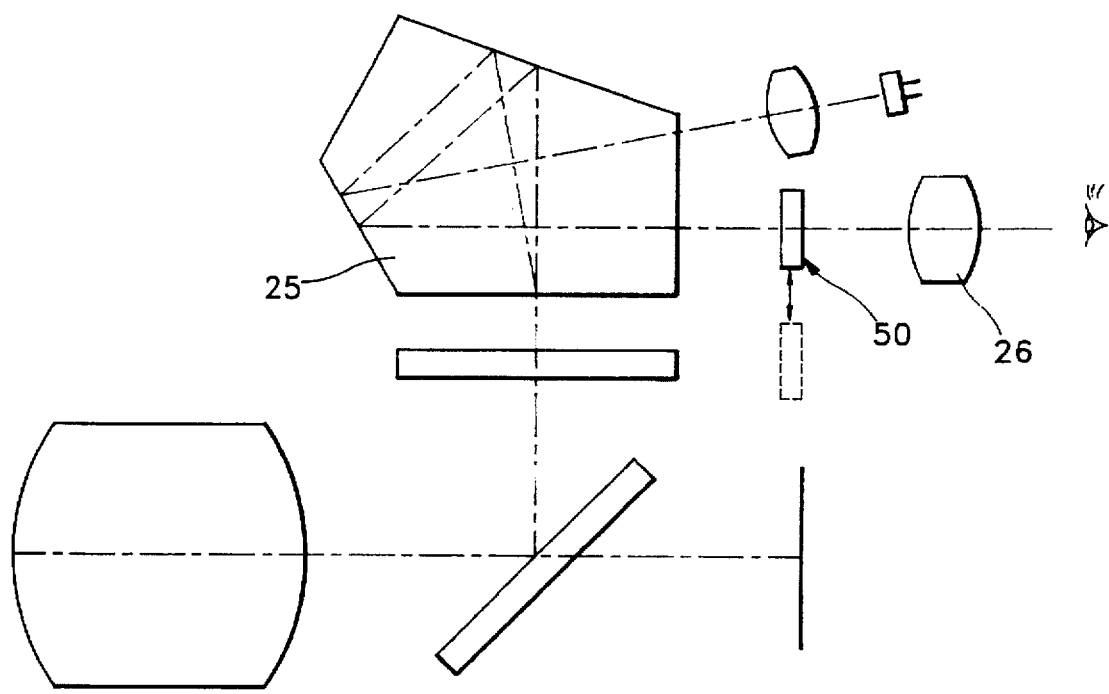
FIG. 9 is a schematic diagram illustrating the optical construction of a camera in accordance with yet another embodiment of the present invention.

FIG. 9 illustrates yet another embodiment of the invention, including a display device having a display portion 50 which is switchably installed in the main light path, preferably between penta-prism 25 and eye lens 26. A switch button (not shown) controls the display portion 50. The standard composition points (not shown) which correspond to the golden section points are displayed on the display portion 50, and the display portion 50 can be moved into and out of the main light path by manipulating the external switch button.

Figure 10:
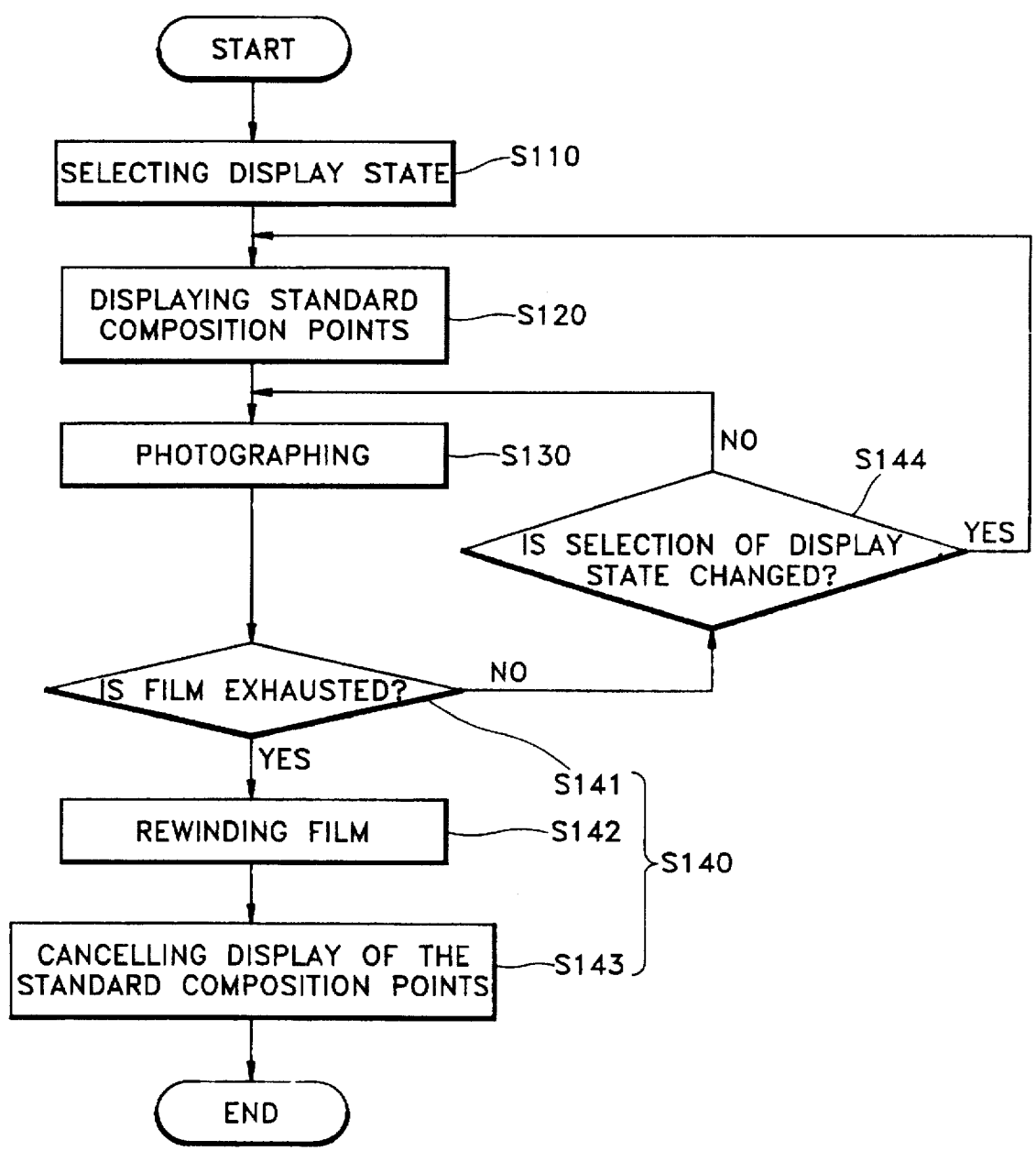
FIG. 10 is a flow chart illustrating a method of displaying standard composition points according to the present invention.

A method of displaying the standard composition points $C_0$–$C_4$ in a camera according to the present invention is explained in detail, referring to FIG. 10. According to the selection of the display state of the standard composition points in step 110, the respective standard composition points are displayed on the display portion 14 (FIG. 5) in step 120. The subject is then photographed in step S130 using the composition points as a guide. Following the photographing step, the display state is initialized in step S140. This step includes the substep of checking film exhaustion in step S141. If the film is exhausted, it is automatically rewound in substep S142 and the standard composition points are cancelled from the display in substep S143. If the film is not exhausted, it is determined whether the selection of the display state of the standard composition points is changed. (substep S144). At this time, if the selection of the display state is not changed, photographing is resumed (step S130). If the selection of the display state is changed, the above steps are performed again by returning to step S120 of the sequence and displaying the standard composition points.

Step S120 may further include displaying the display state of the standard composition points selected by the user on the external display 19 (FIG. 7) installed outside the camera.

Figure 11:
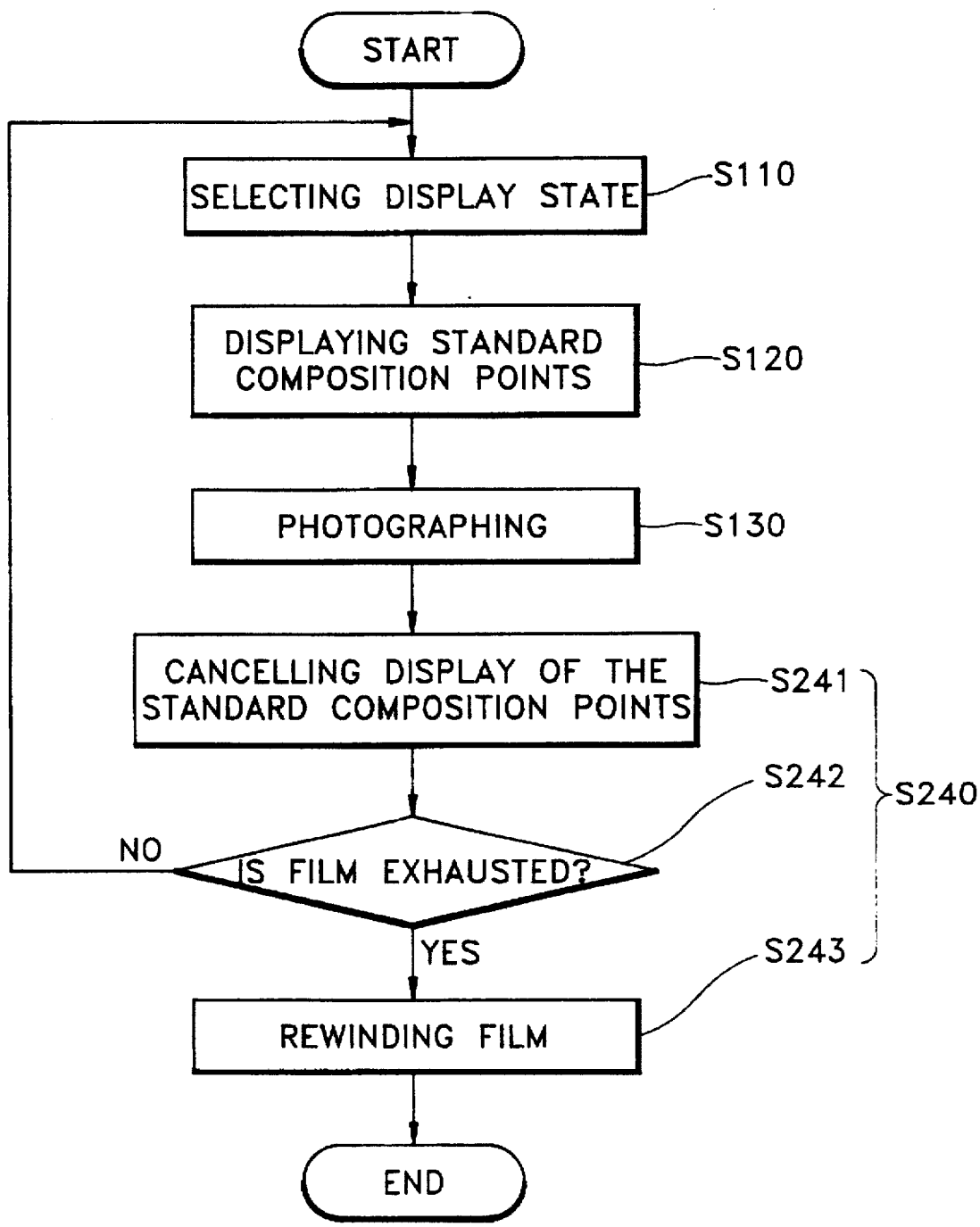
FIG. 11 is a flow chart illustrating another embodiment of a method of displaying standard composition points according to the present invention.

FIG. 11 is a flow chart showing another embodiment of the method of displaying the standard composition points according to the present invention. Here, the same reference numerals as those of FIG. 10 indicate the same steps.

Substep S241 of step S240 initializes the display state, cancelling display of the standard composition points (step S241) after photographing occurs in step S130. After cancelling the display state, it is determined whether the film is exhausted (substep S242). If the film is not exhausted, the sequence returns to initial step S110 where the display state of the standard composition points is newly selected. If the film is exhausted, the film is automatically rewound (substep S243) and the sequence terminates.

As described above, a camera having a picture composition adjustment function according to the present invention provides the user with a selectable composition guide when looking through the camera's viewfinder. As discussed, this guide may be located either inside or outside the camera.

It is to be understood that both the foregoing general description and the following detailed description are exemplary and explanatory only and are not restrictive of the invention, as claimed.

What is claimed is:

1. A camera, comprising:
   an internal main light path having a first end and a second end;
   an object lens located at the first end of the main light path for receiving and transmitting light from a subject, thereby forming a subject image;

a main mirror located in the main light path for receiving and reflecting the subject image;

a penta-prism located in the main light path for receiving the subject image reflected by the main mirror and for further twice reflecting the subject image to form an upright real image of the subject;

an eye lens located at the second end of the main light path, and oriented in a manner permitting a user to view the upright real image;

a photosensitive portion located outside of the main light path on a side of the mirror opposite the main light path, the photosensitive portion being arranged to receive the subject image when the subject image is permitted to pass beyond the main mirror; and a display device having a rectangular display surface located in the main light path, the display surface having a central composition point $C_0$ located at a central junction of diagonals of the display surface, and four surrounding composition points $C_1$, $C_2$, $C_3$, and $C_4$ located at junctions between said diagonals and four lines, each line passing through one corner point of the rectangular display surface, and each line being perpendicular to one of the diagonals.

2. A camera as claimed in claim 1, wherein said display surface is part of a display portion on which said standard composition points are selectively displayed, and wherein the camera further includes a driving portion for applying power to said display portion, and a mode selection portion for controlling a display of said standard composition points according to a user's selection.

3. A camera as claimed in claim 2, wherein said display portion is a transmission liquid crystal display located between said main mirror and said penta-prism.

4. A camera as claimed in claim 3, further including means for resetting the display of standard composition points displayed on said display portion after each photograph is taken.

5. A camera as claimed in claim 3, further including means for maintaining said standard composition points in a selected state unless a selection of the display state is changed by a user.

6. A camera as claimed in claim 2, wherein said display portion includes a plurality of selectively activatable light sources, said light sources arranged to irradiate said display portion and thereby display said standard composition points.

7. A camera as claimed in claim 6, wherein said light sources are light-emitting diodes.

8. A camera as claimed in claim 6, further including means for resetting the display of standard composition points displayed on said display portion after each photograph is taken.

9. A camera as claimed in claim 6, further including means for maintaining said standard composition points in a selected state unless a selection of the display state is changed by a user.

10. A camera as claimed in claim 2, wherein said display device further includes an external display permitting a user to check a display state of said standard composition points by viewing an exterior portion of the camera.

11. A camera as claimed in claim 10, wherein said external display is a liquid crystal display having five display portions corresponding to said respective standard composition points.

12. A camera as claimed in claim 1, wherein said display device includes a transparent material portion releasably located on an exterior of said camera.

13. A camera as claimed in claim 1, wherein said display surface is located on a display portion of the display device, the display portion being installed inside said camera in a manner permitting the display portion to be switched between an operative state and an inoperative state, the camera further including a switch button accessible from an exterior portion of said camera to switch said display portion between said operative and inoperative states.

14. A camera as claimed in claim 13, wherein said display portion is arranged in the main light path between said penta-prism and said eye lens.

15. A method of displaying on a display portion of a display device of a camera standard composition points for enabling a user to adjust picture composition, the display device including a driving portion for applying power supply to said portion, and a mode selection portion for controlling a display of said standard composition points between an initial state and a user selected state, the method comprising the steps of:

selecting a display state of said standard composition points;

displaying on said display portion said standard composition points corresponding to said selected state;

photographing a subject; and resetting the display state of said standard composition points to the initial state, wherein said step of resetting includes the substeps of:
checking whether film is exhausted;
automatically rewinding the film and canceling the display state of said standard composition points if the film is exhausted;
checking whether the selection of the display state of said standard composition points differs from the initial state when the film is not exhausted; and
resetting the display portion to the initial state when the film is not exhausted.

16. A method of displaying standard composition points on a display portion of a display device in a camera, the composition points for providing a picture composition guide to a user, the display device including a driving portion for applying power to said display portion, a mode selection portion for controlling a display of said standard composition points between an initial state and a user selected state, and an external display for indicating a display state of said standard composition points in accordance with signals transmitted thereto from said mode selection portion, the method comprising the steps of:

selecting a display state of said standard composition points;

displaying on said display portion said standard composition points corresponding to said selected state;

displaying a representation of said standard composition points of said selected state on said external display;

photographing a subject; and resetting the display state to said initial state.

17. The method as claimed in claim 16, wherein said step of resetting includes the substeps of checking whether film is exhausted, automatically rewinding the film and cancelling the display state of said standard composition points if the film is exhausted, checking whether the selection of the display state of said standard composition points differs from the initial state when the film is not exhausted, and resetting the display portion to the initial state when the film is not exhausted.

18. The method as claimed in claim 16, wherein said step of resetting the display state includes cancelling a current display state, checking whether film is exhausted, resetting the display portion to the initial state when the film is not exhausted, and automatically rewinding the film when the film is exhausted.

* * * * *